(12) United States Patent
Hofmann et al.

(10) Patent No.: US 8,172,192 B2
(45) Date of Patent: May 8, 2012

(54) LONGITUDINAL DISPLACEMENT DEVICE FOR A MOTOR VEHICLE SEAT

(75) Inventors: Jochen Hofmann, Marktgraitz (DE); Marco Gleissberg, Geringswalde (DE)

(73) Assignee: Brose Fahrzeugteile GmbH & Co. Kommanditgesellschaft, Coburg (DE)

( * ) Notice: Subject to any disclaimer, the term of this patent is extended or adjusted under 35 U.S.C. 154(b) by 0 days.

(21) Appl. No.: 12/433,708

(22) Filed: Apr. 30, 2009

(65) Prior Publication Data
US 2009/0267396 A1   Oct. 29, 2009

Related U.S. Application Data

(63) Continuation of application No. PCT/EP2007/004441, filed on May 18, 2007.

(30) Foreign Application Priority Data

Oct. 31, 2006   (DE) ..................... 20 2006 016 652 U

(51) Int. Cl.
*F16M 13/00*   (2006.01)

(52) U.S. Cl. ..... 248/429; 248/424; 248/430; 296/65.14; 297/344.1

(58) Field of Classification Search .................. 248/419, 248/424, 429, 430; 296/65.14; 297/344.1, 297/344.11
See application file for complete search history.

(56) References Cited

U.S. PATENT DOCUMENTS

| | | | |
|---|---|---|---|
| 4,520,982 A | | 6/1985 | Nishino |
| 4,811,925 A | * | 3/1989 | Fujita et al. ................... 248/430 |
| 4,863,289 A | * | 9/1989 | Lecerf ............................ 384/47 |
| 5,848,775 A | * | 12/1998 | Isomura et al. ............... 248/430 |
| 5,941,495 A | * | 8/1999 | Bauer et al. ................... 248/430 |
| 5,961,088 A | * | 10/1999 | Chabanne et al. ............ 248/429 |
| 5,988,884 A | | 11/1999 | Scheib et al. |
| 6,059,248 A | * | 5/2000 | Bauer et al. ................... 248/430 |
| 6,405,988 B1 | * | 6/2002 | Taylor et al. .................. 248/429 |
| 6,869,057 B2 | * | 3/2005 | Matsumoto et al. .......... 248/430 |
| 6,923,415 B2 | * | 8/2005 | Yokoi et al. ................... 248/424 |
| 7,506,856 B2 | * | 3/2009 | Ikegaya et al. ................ 248/430 |
| 7,677,520 B2 | * | 3/2010 | Beneker et al. ............... 248/430 |
| 7,722,006 B2 | * | 5/2010 | Beneker et al. ............... 248/424 |
| 7,758,008 B2 | * | 7/2010 | Kojima et al. ................ 248/430 |
| 2007/0176072 A1 | * | 8/2007 | Ikegaya et al. ................ 248/429 |

FOREIGN PATENT DOCUMENTS

| | | |
|---|---|---|
| DE | 196 50 698 A1 | 6/1998 |
| DE | 198 04 506 C2 | 8/1999 |
| DE | 198 12 045 A1 | 9/1999 |
| DE | 20 2004 010 499 U1 | 12/2005 |
| FR | 2 847 530 A1 | 5/2004 |

* cited by examiner

*Primary Examiner* — Terrell McKinnon
*Assistant Examiner* — Daniel J Breslin
(74) *Attorney, Agent, or Firm* — Muncy, Geissler, Olds & Lowe, PLLC

(57) ABSTRACT

A longitudinal displacement device is provided that has an upper rail that is displaceable in the longitudinal direction, and a stationary lower rail. A linear guide that has a bearing element for longitudinal guidance and support of the upper rail is located in the longitudinal direction between the upper rail and the lower rail. Provided on the upper rail is a carrier that engages in a recess bounded by two stops and located in the center region of the bearing cage as viewed in the longitudinal direction, in order to carry the bearing cage along. A recess bounded by two stops is located in the center region of the bearing element. Provided on the upper rail is a carrier that engages in the recess. During a displacement of the upper rail, the bearing element is carried along by the carrier, so that the upper rail is always supported on the lower rail over its entire length. The motor vehicle seat can thus be displaced in a smooth-running manner with the application of a small force.

13 Claims, 7 Drawing Sheets

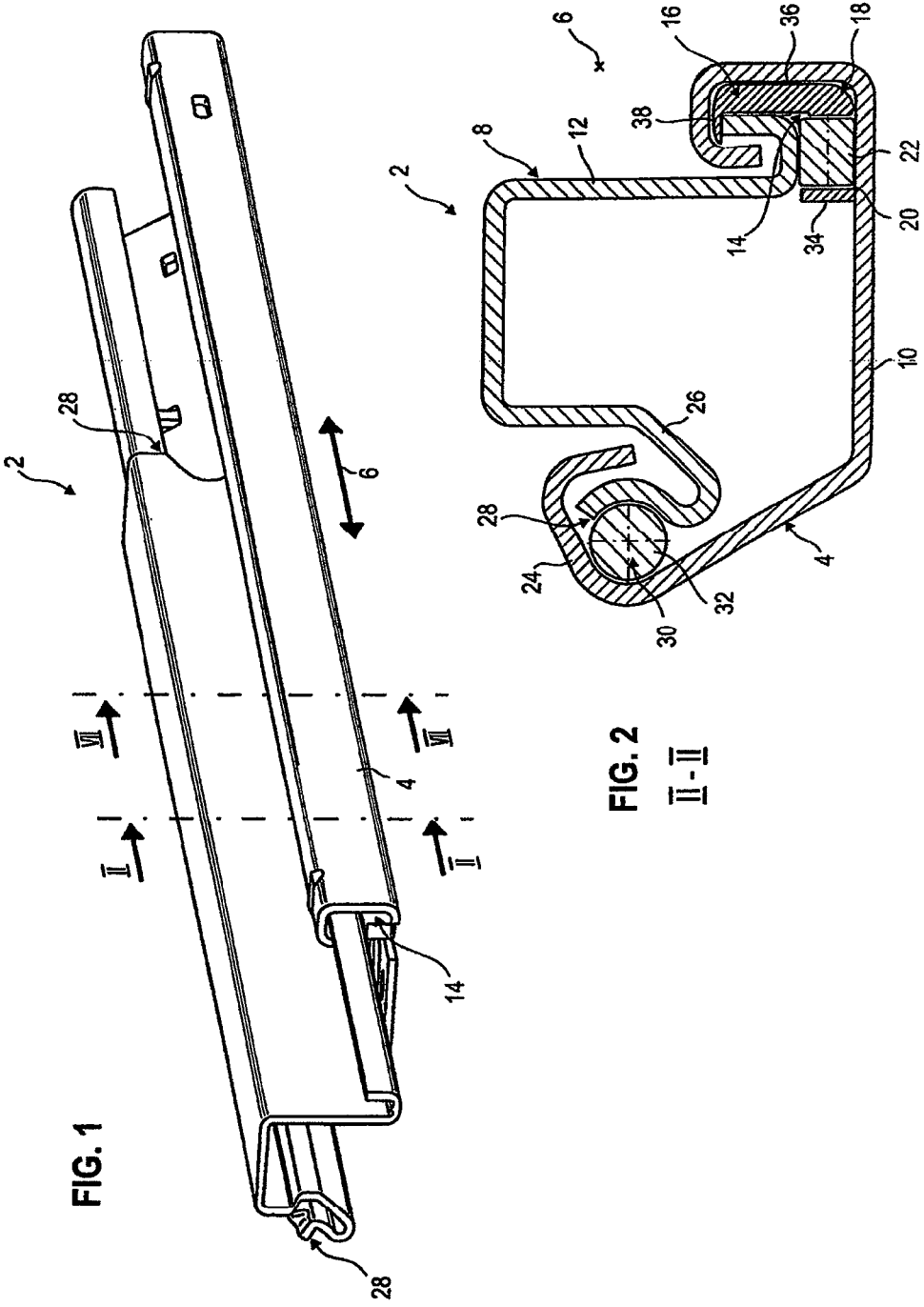

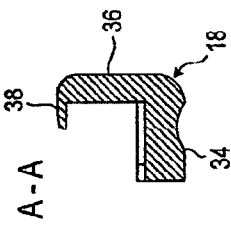
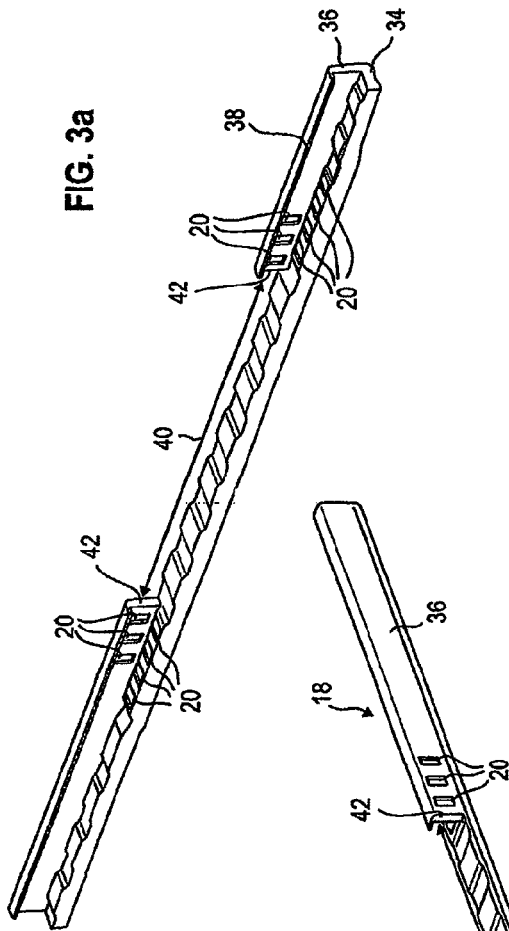
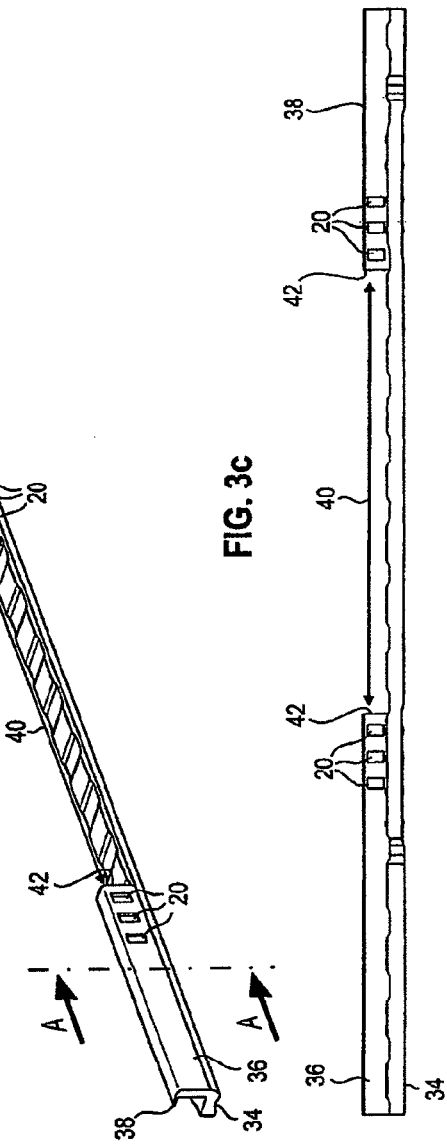

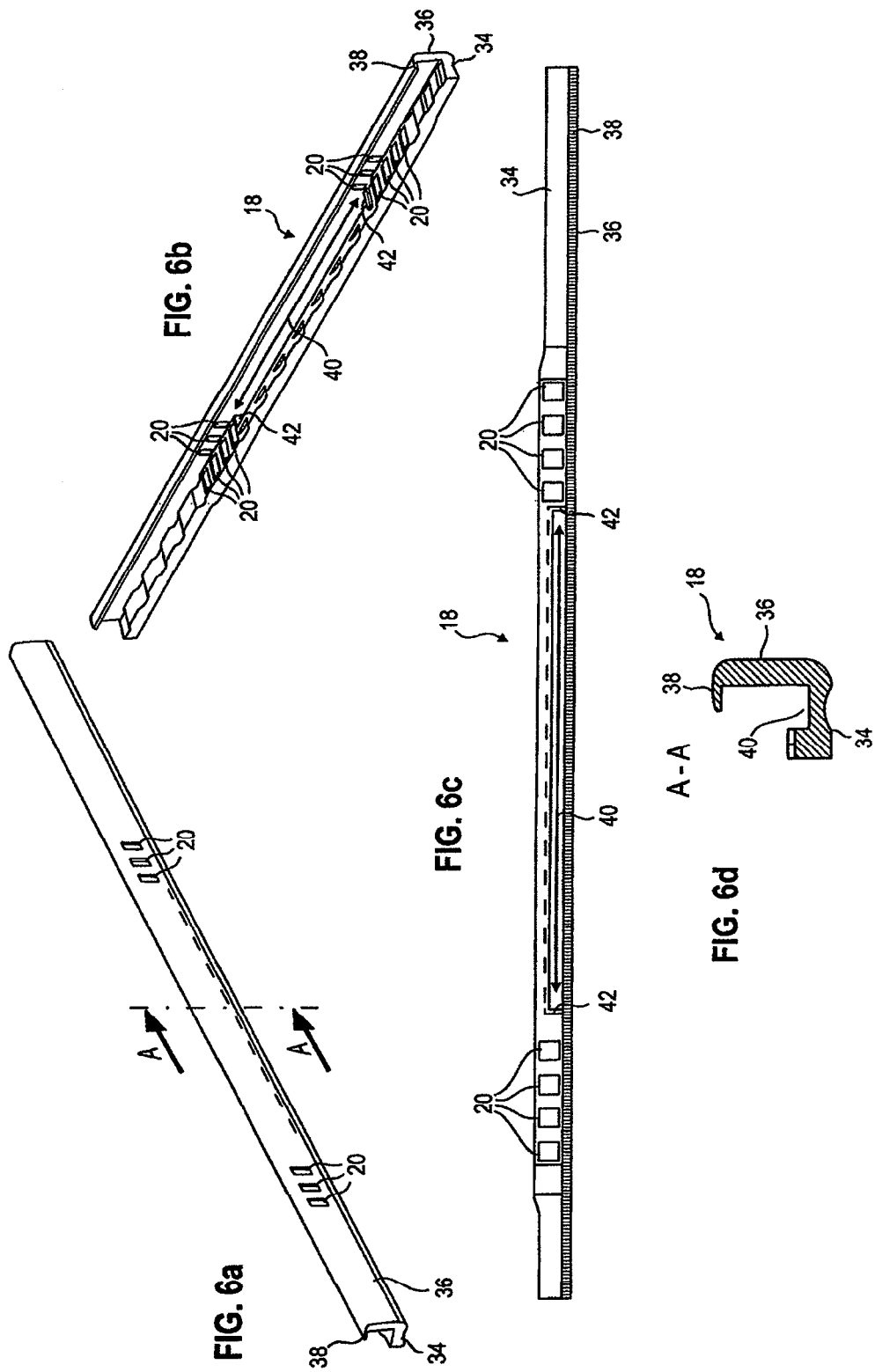

VII-VII

LONGITUDINAL DISPLACEMENT DEVICE FOR A MOTOR VEHICLE SEAT

This nonprovisional application is a continuation of International Application No. PCT/EP2007/004441, which was filed on May 18, 2007, and which claims priority to German Patent Application No. 20 2006 016 652.1, which was filed in Germany on Oct. 31, 2006, and which are both herein incorporated by reference.

BACKGROUND OF THE INVENTION

1. Field of the Invention

The invention relates to a longitudinal displacement device for a motor vehicle seat.

2. Description of the Background Art

A conventional longitudinal displacement device has at least one stationary lower rail and an upper rail that is guided so as to be displaceable along the lower rail. At least one linear guide with a bearing element for linear guidance and support of the upper rail is provided between the upper and lower rails. Typically, in such a longitudinal displacement device two lower rails are arranged parallel to one another in the longitudinal direction of the vehicle. The motor vehicle seat is fastened to the two upper rails displaceably mounted in their corresponding lower rails.

A longitudinal guide for a motor vehicle seat is described in DE 198 12 045 A1. In this longitudinal guide, the upper rail and lower rail are embodied essentially as U-profiles. A linear guide with a bearing element that includes a bearing cage with recesses and roller bodies accommodated therein is located between the upper rail and lower rail. When the upper rail is displaced relative to the lower rail, the linear guide with its bearing cage is carried along with the upper rail. During this process, the linear guide supports the upper rail on the lower rail by means of its roller bodies. This carrying along often is not completely carried out, so that the upper rail is only inadequately supported, especially at its ends.

SUMMARY OF THE INVENTION

It is therefore an object of the present invention to provide a longitudinal displacement device in which the support of the upper rail is improved, and which thus permits particularly precise and smooth-running displacement of the upper rail, and thus of the motor vehicle seat.

To this end, a bearing element can have a recess in its center region, bounded by two stops. Provided on the upper rail is a carrier that engages in the recess and carries the bearing element along during a displacement of the upper rail.

During a longitudinal displacement of the motor vehicle seat rigidly attached to the upper rail, the upper rail can move with its carrier in the recess of the bearing element up to one of the two stops. As soon as the carrier contacts the stop, the part of the linear guide that is located ahead of the carrier in the direction of displacement is pushed through the corresponding guide channel. Conversely, the part of the linear guide that is located behind the carrier in the direction of displacement is pulled through the guide channel. Especially as a consequence of the partial pulling, there is a controlled transmission of force to the linear guide, and thus a defined carrying along of the linear guide with the upper rail. In this way, the upper rail is supported on the lower rail by the bearing element over its entire length.

The surface pressure acting on the bearing element is thus reduced relative to a design according to the prior art. The upper rail and lower rail deform less, so that the upper rail can more easily be displaced relative to the lower rail with less application of force. Moreover, the lifetime of the bearing element is extended as a result of the reduced surface pressure. This design also achieves a reduction in the play between the upper and lower rails.

In an embodiment, the bearing element can include a bearing cage with recesses and roller bodies accommodated therein. A bearing cage is relatively easy to manufacture. Roller bodies are produced as standardized rollers or balls in various sizes, whose respective maximum loading is predefined and known. Thus, a different type and number of roller bodies can be used depending on the application, so that the surface pressure from the upper rail acting on the roller bodies is accommodated safely by the roller bodies and the upper rail can be displaced in a smooth-running fashion. Furthermore, a bearing element designed with roller bodies can support a higher surface pressure than a bearing element designed as a plain bearing, for example. Roller bodies designed as rollers accommodate an especially high surface pressure. The number and geometry of the recesses accommodating the roller bodies can also be adapted to the application in a simple manner. A reduction in play is also achieved by this means.

Each of the recesses can be located adjacent to the fixed stops. The force acting on a stop when the upper rail is displaced is thus transmitted directly to the roller bodies located in the recesses that lie immediately ahead of the stop in the direction of displacement. The upper rail can thus be displaced in a smooth-running manner with the application of a small force. The danger of the bearing element sticking between the upper rail and lower rail is also reduced.

In an embodiment, the upper rail and lower rail, viewed in cross-section, each can have two legs curved at the ends. In this regard, the upper rail and lower rail are arranged relative to one another such that, taken together, they result in an essentially rectangular cross-section. One leg each of the upper rail and the lower rail engage around one another to form a bearing region to accommodate the linear guide as well as another linear guide.

The first leg of the lower rail thus can form the bottom of the rectangular structure, and the second leg of the lower rail forms the first sidewall thereof. The first leg of the upper rail forms the top of the rectangular structure, and the second leg of the upper rail forms the second side wall thereof. As a result of the multiple bends in the upper rail and lower rail, the combination is very stiff in torsion from a mechanical point of view, which contributes to its life span.

The bearing element of the linear guide can have a cross-section perpendicular to the longitudinal direction with a first L-shaped leg and a second L-shaped leg. In particular, when the first L-shaped leg rests against the bottom of the lower rail, it is supported over its area by the lower rail. When, in addition, the second L-shaped leg rests against the sidewall formed by the upper rail and lower rail, the position of the bearing element is exactly defined. Recesses to accommodate roller bodies can be made in the two L-shaped legs in a simple manner. If the roller bodies are rollers, the upper rail is supported against the lower rail in an especially efficient manner.

In an embodiment, the second L-shaped leg is not formed, or is not fully formed, in the center region of the bearing element. The recess with its two stops is formed in this way. Such a recess can easily be made in the second L-shaped leg. The rest of the geometry of the bearing cage remains unchanged. Consequently, if the bearing cage of the linear guide is made of plastic in an injection molding process, for example, only a minor modification of a previously used injection mold is required.

In another embodiment, the first L-shaped leg of the bearing cage can have a slot extending in the longitudinal direction as the recess. The two stops are thus formed by the two edges of the slot in the longitudinal direction. A slot is simple to introduce in the bearing cage by production means, for example by milling. If the bearing cage of the linear guide is made of plastic in an injection molding process, for example, no modification of a previously used injection mold is required in this case.

It is useful to provide an outward bend in the upper rail as a carrier. Such an outward bend can be introduced into a profile part in a simple manner. Additional attached parts are not necessary, so the production effort remains small. The carrier is embodied here as a tongue introduced into and bent out from the sidewall of the upper rail. Such a tongue can be introduced into the upper rail in a simple and economical manner by stamping.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates a longitudinal displacement device with two linear guides in perspective view;

FIG. 2 illustrates the longitudinal displacement device from FIG. 1 in cross-section perpendicular to the longitudinal direction along the section line II-II in FIG. 1;

FIG. 3a-d illustrate a first bearing cage of the first linear guide in two perspective views, a side view, and a cross-sectional view;

FIG. 6a-d illustrate a second bearing cage of the first linear guide in two perspective views, a side view, and a cross-sectional view;

DETAILED DESCRIPTION

Figures 4A, 4B:
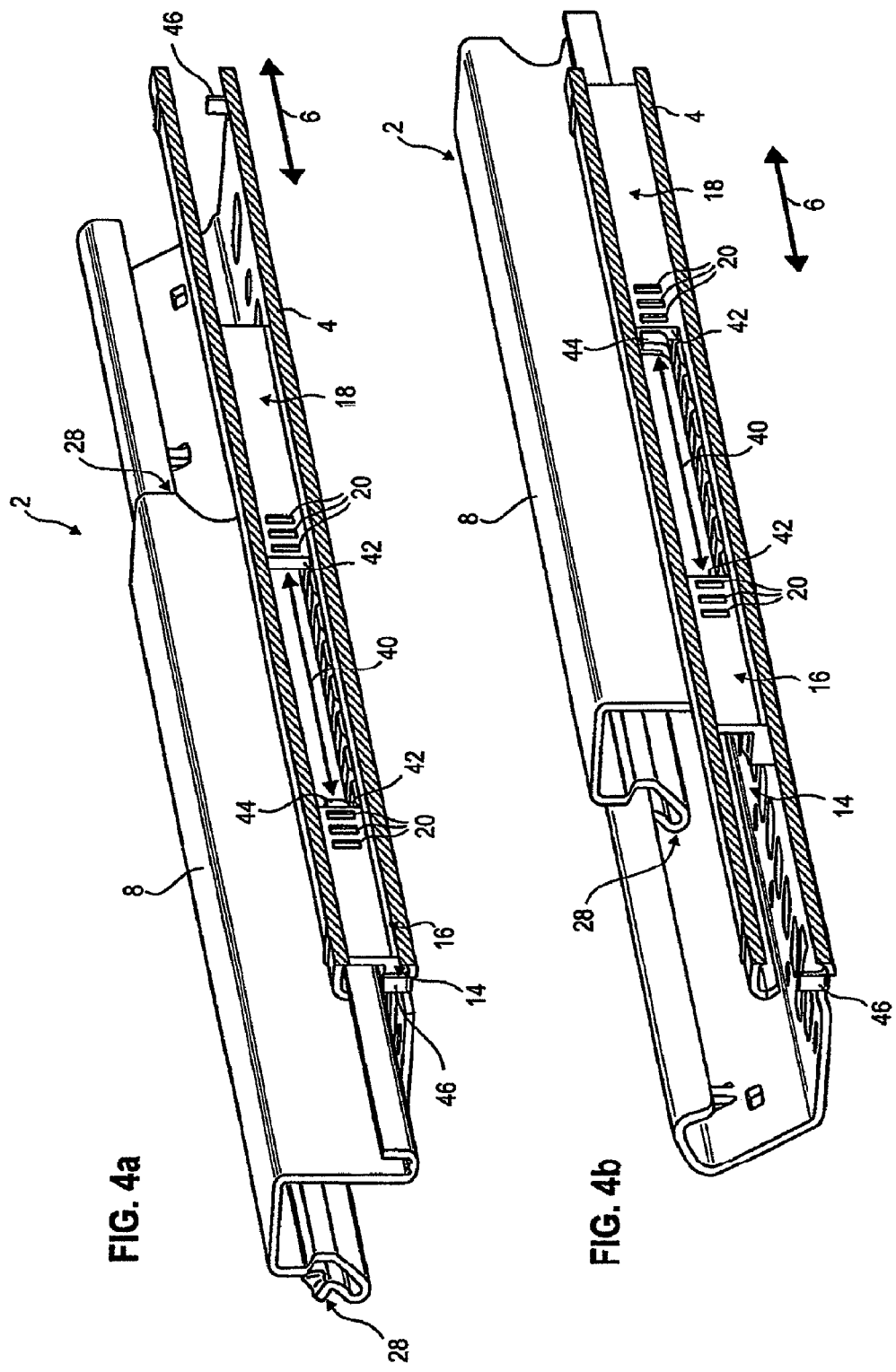
FIG. 4a, b illustrate a displacement of the upper rail relative to the lower rail in two perspective views.

In FIG. 1, a longitudinal displacement device 2 has a stationary lower rail 4 and an upper rail 8 that is displaceable in the longitudinal direction 6 relative to the lower rail. The upper rail 8 and lower rail 4 are designed essentially as U-profiles. They are arranged here with respect to one another so that an essentially rectangular cross-sectional profile results. The upper rail 8 and lower rail 4, viewed in cross-section, each have two legs 10, 12, 24, 26 curved at the ends.

The first leg 10 of the lower rail 4 that forms the bottom of the rectangular profile, and the first leg 12 of the upper rail 8 that forms the first side wall of the rectangular profile, engage around one another with their ends and form a first bearing region 14. This is evident in particular from FIG. 2, which shows a cross-section of the longitudinal displacement device 2 perpendicular to its longitudinal direction 6. A first linear guide 16 with a bearing element 18, 20, 22 is located in the bearing region 14. The bearing element 18, 20, 22 is composed of a bearing cage 18 and roller bodies 22, embodied as rollers, located in recesses 20. The cross-section of FIG. 2 runs precisely through a roller body 22. The first linear guide 16 supports primarily forces acting vertically from the upper rail 8 to the lower rail 4 by means of the roller bodies 22.

The second leg 24 of the lower rail 4 that forms the second side wall of the rectangular cross-sectional profile, and the second leg 26 of the upper rail 8 that forms its top, enclose one another at their ends so as to produce a bearing region 28 that is essentially cylindrical in the longitudinal direction and in which a second linear guide 30 is guided. The second linear guide 30 comprises balls as roller bodies 32, which are located at both ends of the bearing region in the longitudinal direction 6 and are separated from one another by a spacer that is not shown in the figures. The cross section in FIG. 2 passes precisely through a roller body 32. The second linear guide 28 supports primarily forces acting horizontally from the upper roller 8 to the lower rail 4 by means of the roller bodies 32.

FIG. 3a-d shows the bearing cage 18 in two perspective views, a side view, and a cross-section labeled A-A. The bearing cage 18 has two L-shaped legs and is located in the bearing region 14, as is evident in particular from FIG. 2. The outer narrow side of its first L-shaped leg 34 is located at the bottom of the rectangular cross-sectional profile, and its inner narrow side is located at the upper rail 8. The outer narrow side of its second L-shaped leg 36 is located at the end of the first leg 10 of the lower rail 4, and its inner narrow side is located at the end of the first leg 12 of the upper rail 8. The projection 38 at the end of the second L-shaped leg 36 engages around the end of the first leg 12 of the upper leg 8 to further stabilize the bearing cage 18.

Recesses 20 to accommodate roller bodies 22, not shown in FIG. 3, are located in both L-shaped legs 34, 36. The bearing cage 18 has a recess 40 in the longitudinal direction 6 that is formed by an omission of the second L-shaped leg 36. The boundaries of the recess 40 are formed by two stops 42 whose surfaces extend perpendicular to the longitudinal direction 6.

FIG. 4a, b shows the displacement of the upper rail 8 relative to the lower rail 4 in two perspective drawings in the two possible end positions. For reasons of clarity, the lower rail 4 is shown cut away to provide visibility for the linear guide 16. The upper rail 8 has a tongue-shaped outward bend as carrier 44, with which it engages the recess 40 of the bearing cage 18. When the upper rail 8 is displaced relative to the lower rail 4, the carrier 44 comes in contact with one of the stops 42 of the bearing cage 18.

The bearing cage 18 is now partly pulled along with, and partly pushed along by, the upper rail 8. This achieves the result that the roller bodies 22 uniformly support the upper rail 8 on the lower rail 4 over its entire length. Sticking of the bearing cage 18, which results in impaired support of the upper rail 8, is thus reliably avoided. Instead, the bearing cage is always reliably brought along when the motor vehicle seat is pushed forward or backward in the longitudinal direction. The support of the upper rail 8 over its entire length reduces the surface pressure on the individual roller bodies 22 and achieves smooth-running displacement of the upper rail 8, and thus the entire motor vehicle seat, with the application of a small force. The displacement takes place until one end of the bearing cage 8 comes into contact with an end stop 46 that is bent outward from the lower rail 4 in a tongue-like manner.

Figure 5A:
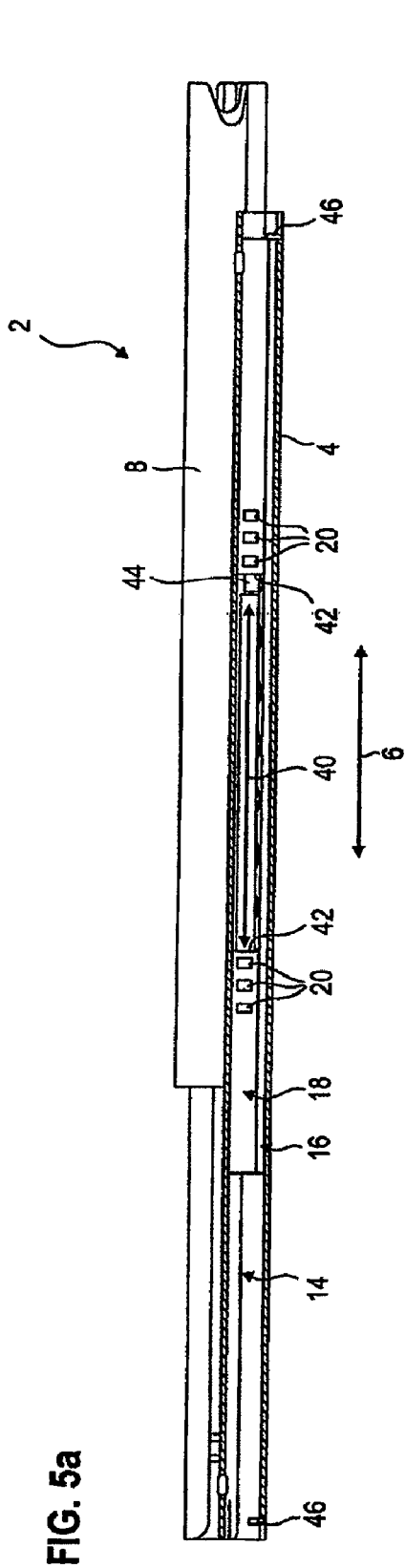
FIG. 5a, b illustrates a displacement of the upper rail relative to the lower rail in two side views.

FIG. 5a, b once again shows the two possible end positions for the displacement in the longitudinal direction 6 of the upper rail 8 relative to the lower rail 4.

FIG. 6a-d shows a second variant of the bearing cage 18 in two perspective views, a side view, and a cross section labeled A-A. As recess 40, the bearing cage 18 has a slot extending in its center region in the longitudinal direction 6, which slot can be made in the bearing cage 18 by simple means, for example by milling. The two boundaries of the slot in the longitudinal direction 6 form the two stops 42.

Figure 7:
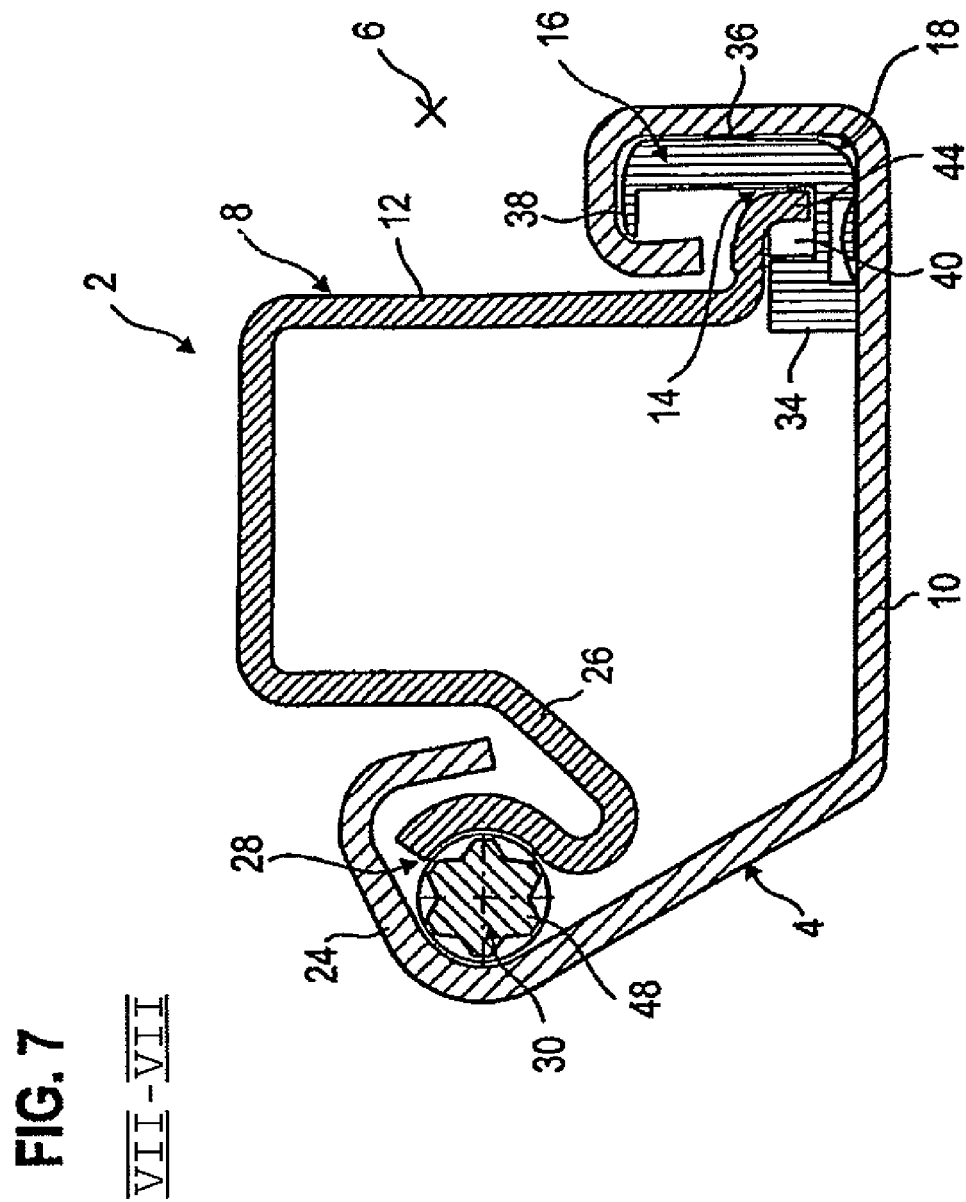
FIG. 7 illustrates a longitudinal displacement device with the bearing cage from FIG. 6 in cross-section perpendicular to the longitudinal direction along the section line VII-VII in FIG. 1.

FIG. 7 shows a cross-sectional drawing perpendicular to the longitudinal direction 6 in the vicinity of the carrier 44. The carrier 44 engages in the recess 40 of the bearing cage 18, embodied as a slot. The carrier 44 here is designed such that it does not contact the walls of the recess 44, and thus does not hinder displacement of the upper rail 8 in the longitudinal direction 6. A spacer 48 is located in the second bearing region, and maintains the spacing of the roller bodies 32 that are located in the second bearing region 28 at both ends of the longitudinal displacement device 2.

Figure 5B:
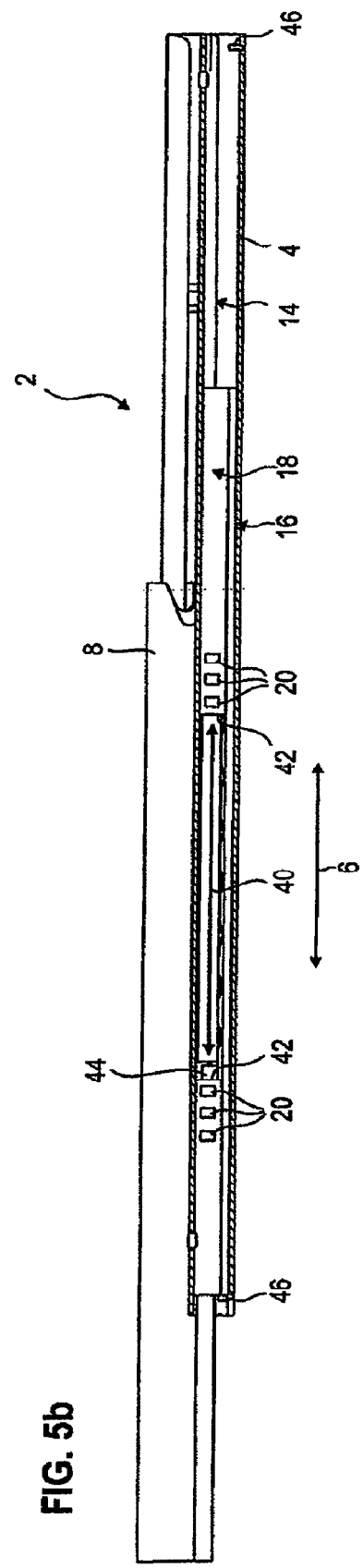
Figure 8A:
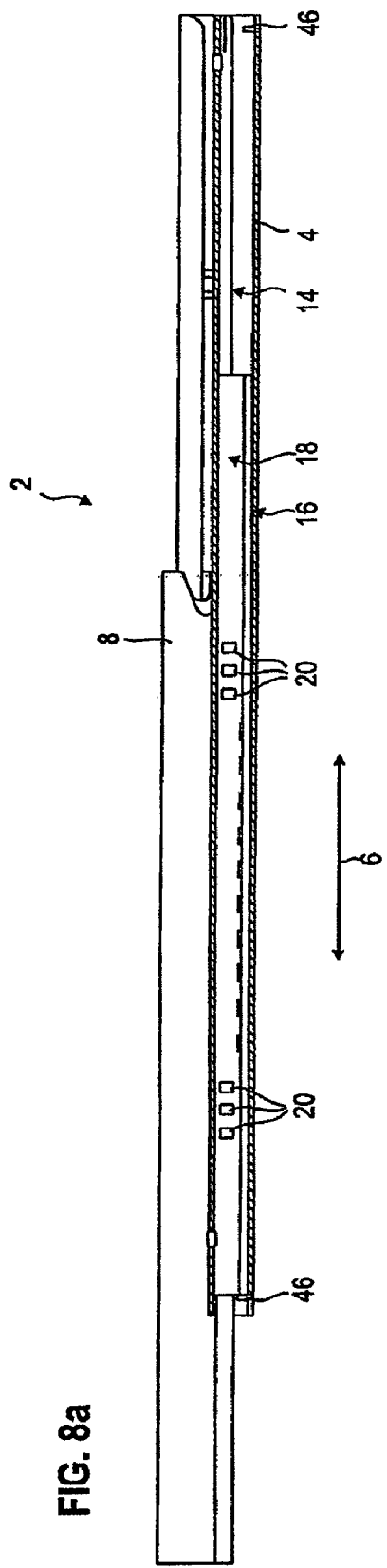
FIG. 8a, b illustrate a displacement of the upper rail relative to the lower rail in two side views.
Figure 8B:
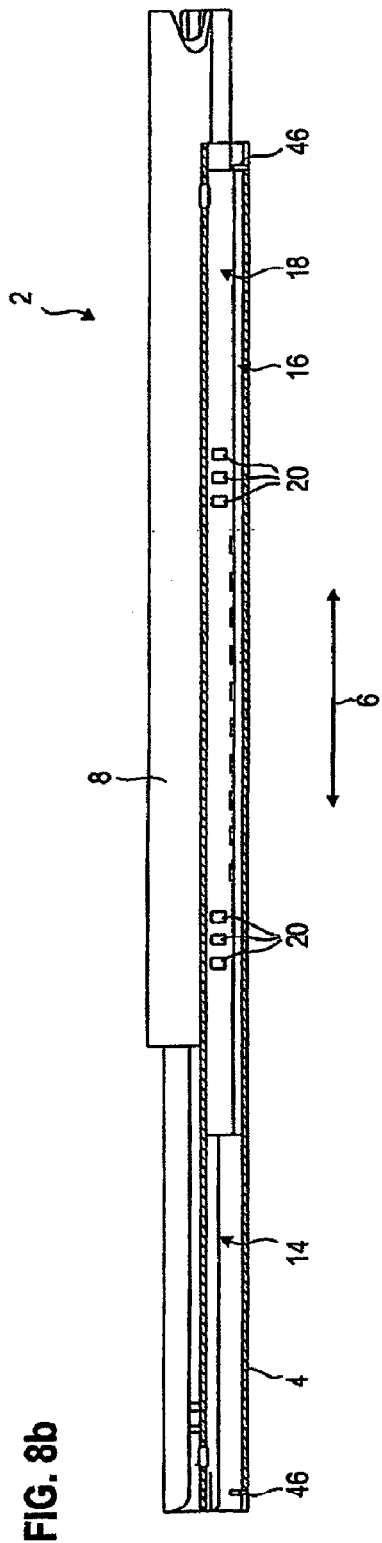

FIG. 8a, b shows a side view of the two possible end positions for a displacement of the upper rail 8 relative to the lower rail 4. The second leg 36 of the bearing cage 18 covers the carrier 44 and the recess 40 with its two stops 42. During a displacement of the upper rail 8, the carrier 44 comes into contact with one of the two stops 42. The bearing cage 18, and thus the entire linear guide 16, is thus moved along with the upper rail 8 in a manner analogous to that described in FIGS. 4 and 5. The second variant of the bearing cage 18, with a slot as the recess 40 in the center region, also guarantees support of the upper rail 8 on the lower rail 4 that is improved over the prior art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A longitudinal displacement device for a motor vehicle seat comprising:
    an upper rail that is configured to be fastened to the motor vehicle seat and is displaceable in a longitudinal direction;
    a stationary lower rail;
    a linear guide provided in the longitudinal direction between the upper rail and the lower rail, the linear guide including a bearing element for longitudinal guidance and support of the upper rail, wherein a recess is provided in the center region of the bearing element, the recess being bounded by a forward stop and a backward stop spaced apart in the longitudinal direction; and
    a carrier on the upper rail for carrying along the bearing element via an engagement in the recess, wherein the entire bearing element is carried along by the carrier in a forward direction when the carrier engages the forward stop bounding the recess to support the upper rail in a forward position, and wherein the entire bearing element is carried along by the carrier in a backward direction when the carrier engages the backward stop bounding the recess to support the upper rail in a backward position.

2. A longitudinal displacement device according to claim 1, wherein the bearing element comprises a bearing cage with recesses and roller bodies accommodated therein.

3. A longitudinal displacement device according to claim 2, wherein each of the recesses of the bearing cage is located adjacent to the fixed stops.

4. A longitudinal displacement device according to claim 1, wherein the upper rail and lower rail, viewed in cross-section, each have two legs curved at the ends, wherein the upper rail and lower rail are arranged such that, taken together, they result in an essentially rectangular cross-section, and wherein one leg of the upper rail and one leg of the lower rail respectively engage around one another to form bearing regions in which the linear guide as well as another linear guide are accommodated.

5. A longitudinal displacement device according to claim 1, wherein the bearing element has an L-shaped cross-section perpendicular to the longitudinal direction with a first L-shaped leg and a second L-shaped leg.

6. A longitudinal displacement device according to claim 5, wherein the outer narrow side of the first L-shaped leg is located at the bottom of the lower rail, and wherein the outer narrow side of the second L-shaped leg is located at a sidewall of the lower rail.

7. A longitudinal displacement device according to claim 5, wherein the inner narrow sides of the L-shaped legs are located at a bend of the upper rail.

8. A longitudinal displacement device according to claim 5, wherein the second L-shaped leg is not formed, or is not fully formed, in the center region of the bearing element in the longitudinal direction, and the recess with its two stops is formed in this way.

9. A longitudinal displacement device according to claim 5, wherein one of the two L-shaped legs has a slot, and the recess with its two stops is formed in this way.

10. A longitudinal displacement device according to claim 1, further comprising an outward bend of the side wall of the upper rail that is oriented toward the lower rail as a carrier.

11. A longitudinal displacement device according to claim 1, wherein the two stops are part of the bearing element.

12. A longitudinal displacement device according to claim 1, wherein the bearing element is formed as a single piece including the recess and stops.

13. A longitudinal displacement device according to claim 1, wherein the recess is of a fixed width.

* * * * *